United States Patent
Shima

(10) Patent No.: US 7,634,680 B2
(45) Date of Patent: Dec. 15, 2009

(54) ABNORMALITY DIAGNOSIS SYSTEM

(75) Inventor: Toshihiro Shima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 524 days.

(21) Appl. No.: 11/302,207

(22) Filed: Dec. 14, 2005

(65) Prior Publication Data

US 2006/0149992 A1 Jul. 6, 2006

(30) Foreign Application Priority Data

Dec. 15, 2004 (JP) ............................. 2004-362415

(51) Int. Cl.
*G06F 11/00* (2006.01)
(52) U.S. Cl. ......................................................... 714/4
(58) Field of Classification Search ....................... 714/4
See application file for complete search history.

(56) References Cited

U.S. PATENT DOCUMENTS 6,665,820 B1* 12/2003 Frowein et al. ............... 714/43
2002/0004798 A1* 1/2002 Babula et al. ............ 707/104.1

FOREIGN PATENT DOCUMENTS

JP  2002-288066 A  10/2002

* cited by examiner

*Primary Examiner*—Scott T Baderman
*Assistant Examiner*—Jigar Patel
(74) *Attorney, Agent, or Firm*—Sughrue Mion, PLLC

(57) ABSTRACT

In an abnormality diagnosis system of the invention where multiple devices and a server S are interconnected via a network, a communication failure may occur between the server S and one device (diagnosis object printer P1) among the multiple devices. On the occurrence of the communication failure, the server S instructs another device (diagnosis execution printer P2) among the multiple devices other than the diagnosis object printer P1 to make a diagnosis of abnormality in the diagnosis object printer P1. In response to the instruction, the diagnosis execution printer P2 obtains communication setting information from the diagnosis object printer P1, and compares the obtained communication setting information with own communication setting information stored in the self printer or the diagnosis execution printer P2. The diagnosis execution printer P2 refers to a result of the comparison, makes diagnosis of the communication failure due to an error of the communication setting information set in the diagnosis object printer P1, and informs the server S of a result of the diagnosis. This arrangement of the invention enables easy diagnosis of abnormality in the diagnosis object printer P1 in the event of a communication failure between the diagnosis object printer P1 and the server S.

8 Claims, 6 Drawing Sheets

ABNORMALITY DIAGNOSIS SYSTEM

BACKGROUND OF THE INVENTION

1. Filed of the Invention

The present invention relates to a technique of making a diagnosis of abnormality in a device in the event of a communication failure between the device and a server.

2. Description of the Related Art

Monitor systems have been proposed recently to use a server to monitor multiple printers located in an intranet via the Internet.

In the proposed monitor system, the intranet is connected via a proxy server to the Internet. A firewall is set in the proxy server to block unauthorized accesses from the Internet and interfere with a direct access from the server to the intranet. Each of the multiple printers located in the intranet thus voluntarily makes an access to the server via the Internet and informs the server of a result of the self monitoring.

A known technique related to the monitor system enables a client to monitor copying machines via a communication device as disclosed in Japanese Patent Laid-Open Gazette No. 2002-288066.

In the prior art monitor system, when a printer included in the intranet has some abnormality and fails to access to the server (in the event of a communication failure between the server and the printer), the server can not make a diagnosis of abnormality in the printer because of the interference with the direct access from the server to the intranet.

The monitor system may be adopted to monitor diversity of other devices as well as the printers, and similar problems may occur in any of such monitor systems.

SUMMARY OF THE INVENTION

The object of the invention is thus to eliminate the drawbacks of the prior art monitor systems and to provide a technique of enabling easy diagnosis of abnormality in a device in the event of a communication failure between the device and a server.

In order to attain at least part of the above and the other related objects, the present invention is directed to a first abnormality diagnosis system that includes a server and multiple devices interconnected via a network. On occurrence of a communication failure between the server and a first device among the multiple devices, the server instructs a second device among the multiple devices other than the first device to make a diagnosis of abnormality in the first device.

In response to the instruction, the second device makes diagnosis of the communication failure with regard to the first device and informs the server of a result of the diagnosis.

In the first abnormality diagnosis system of the invention, the server instructs the second device to make a diagnosis of abnormality in the first device and to inform the server of a result of the diagnosis. Even when the first device is located inside an intranet having a firewall that interferes with a direct access from the server, the first abnormality diagnosis system causes the second device located inside the intranet to make a diagnosis of abnormality in the first device.

The invention is also directed to a second abnormality diagnosis system that includes a server and multiple devices interconnected via a network. On occurrence of a communication failure between the server and a first device among the multiple devices, the server instructs a second device among the multiple devices other than the first device to make a diagnosis of abnormality in the first device.

The second device receives the instruction and obtains first setting information, which is required for communication with the server and is set in the first device, from the first device. The second device compares the obtained first setting information with second setting information, which is required for communication with the server and is set in the second device, to make diagnosis of the communication failure due to an error of the first setting information, and informs the server of a result of the diagnosis.

Like the first abnormality diagnosis system, in the second abnormality diagnosis system of the invention, the server instructs the second device to make a diagnosis of abnormality in the first device and to inform the server of a result of the diagnosis. Even when the first device is located inside an intranet having a firewall that interferes with a direct access from the server, the second abnormality diagnosis system causes the second device located inside the intranet to make a diagnosis of abnormality in the first device.

In the second abnormality diagnosis system of the invention, the second device compares the first setting information set in the first device with the second setting information set in the second device and makes diagnosis of the communication failure due to an error of the first setting information. This arrangement readily identifies whether the communication failure is ascribed to an abnormality of the first device.

The invention is further directed to a third abnormality diagnosis system that includes a server and multiple devices interconnected via a network. On occurrence of a communication failure between the server and a first device among the multiple devices, the server instructs a second device among the multiple devices other than the first device to make a diagnosis of abnormality in the first device.

The second device receives the instruction and requests the first device to transmit a diagnosis signal to at least one communication device located on a communication path from the first device to the server.

The first device transmits the diagnosis signal to the communication device upon the request and receives a response from the communication device to the diagnosis signal.

The second device acquires a result of the response from the communication device to the diagnosis signal, from the first device and makes diagnosis of the communication failure due to an abnormality on the communication path, based on the acquired result of the response. The second device informs the server of a result of the diagnosis.

Like the first abnormality diagnosis system, in the third abnormality diagnosis system of the invention, the server instructs the second device to make a diagnosis of abnormality in the first device and to inform the server of a result of the diagnosis. Even when the first device is located inside an intranet having a firewall that interferes with a direct access from the server, the third abnormality diagnosis system causes the second device located inside the intranet to make a diagnosis of abnormality in the first device.

In the third abnormality diagnosis system of the invention, the second device requests the first device to transmit a diagnosis signal to the communication device located on the communication path between the first device and the server. The second device makes diagnosis of the communication failure due to an abnormality on the communication path, based on the result of the response from the communication device to the diagnosis signal. This arrangement readily identifies whether the communication failure is ascribed to an abnormality of the network path.

The invention is also directed to a fourth abnormality diagnosis system that includes a server and multiple devices interconnected via a network. On occurrence of a communication failure between the server and a first device among the multiple devices, the server instructs a second device among the multiple devices other than the first device to make a diagnosis of abnormality in the first device.

The second device receives the instruction, transmits a diagnosis signal to the first device, and receives a response from the first device to the diagnosis signal. The second device makes diagnosis of the communication failure based on the response from the first device to the diagnosis signal, and informs the server of a result of the diagnosis.

Like the first abnormality diagnosis system, in the fourth abnormality diagnosis system of the invention, the server instructs the second device to make a diagnosis of abnormality in the first device and to inform the server of a result of the diagnosis. Even when the first device is located inside an intranet having a firewall that interferes with a direct access from the server, the fourth abnormality diagnosis system causes the second device located inside the intranet to make a diagnosis of abnormality in the first device.

In the fourth abnormality diagnosis system of the invention, the second device transmits a diagnosis signal to the first device and makes diagnosis of the communication failure, based on the response from the first device to the diagnosis signal. This arrangement readily identifies whether the communication failure is ascribed to either an abnormality of the first device or an abnormality of the network path from the second device to the first device.

In one preferable structure of any of the abnormality diagnosis systems of the invention, the first device and the second device are located inside a firewall that blocks an external access under a predetermined condition, and the server is located outside the firewall.

In the structure where the devices are located inside the firewall and the server is located outside the firewall, the server can not make a direct access to the device. In the abnormality diagnosis system of the invention, the server instructs the second device to make a diagnosis of abnormality in the first device and to inform the server of a result of the diagnosis. The server can thus identify the cause of the communication failure between the first device and the server.

The technique of the invention is not restricted to the abnormality diagnosis systems described above, but is also actualized by corresponding abnormality diagnosable devices and corresponding abnormality diagnosis methods. Other possible applications of the invention include computer programs to establish any of the abnormality diagnosis systems, the abnormality diagnosable devices, and the abnormality diagnosis methods, recording media in which such computer programs are recorded, and data signals that include such computer programs and are embodied in carrier waves.

DESCRIPTION OF THE PREFERRED EMBODIMENTS

Figure 1:
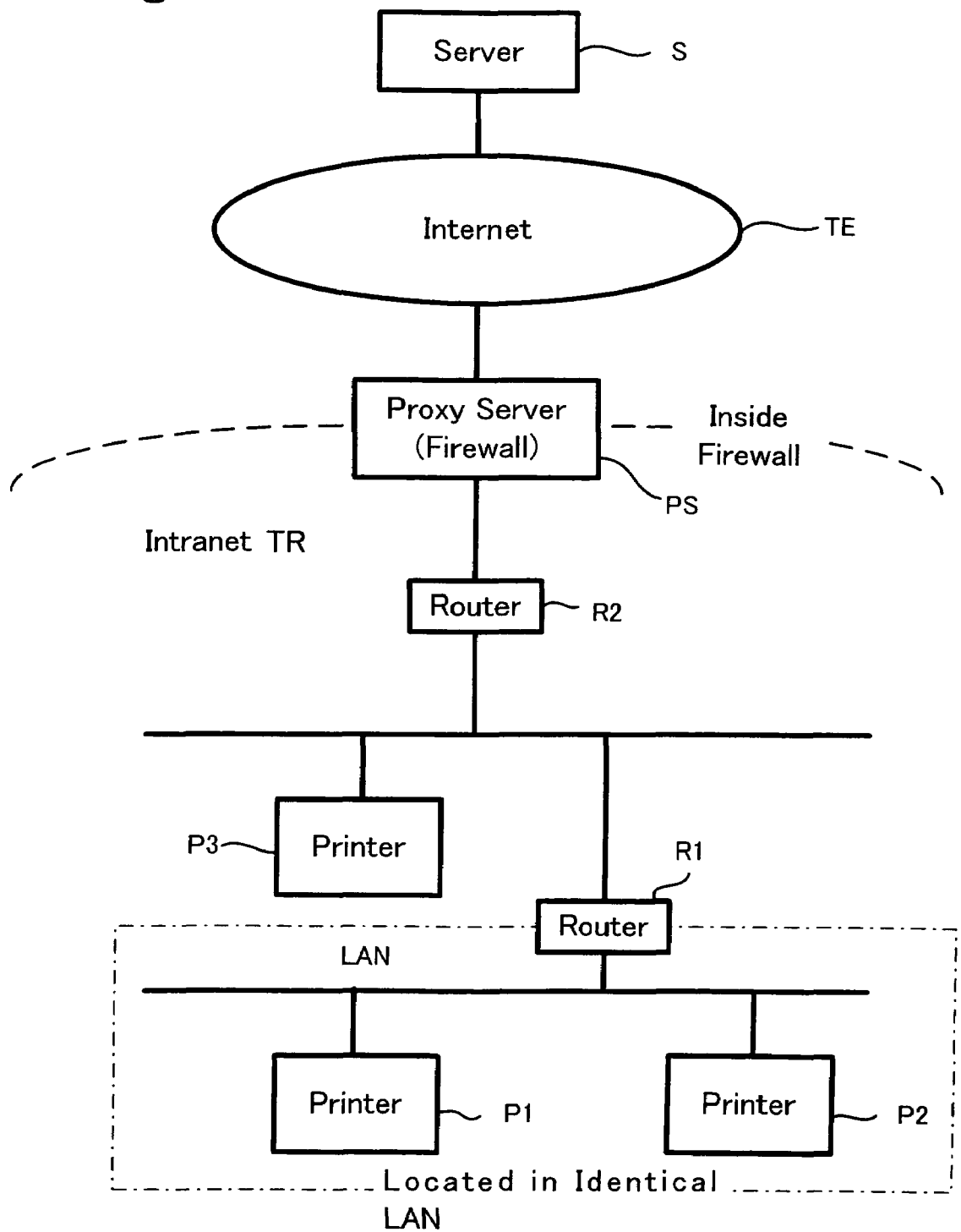
FIG. 1 is a block diagram schematically illustrating the configuration of a printer monitor system as one embodiment of the abnormality diagnosis system of the invention.

One mode of carrying out the invention is described below as a preferred embodiment in the following sequence:
A. System Configuration of Embodiment
  A-1. Configuration of Printer Monitor System
  A-2. Structure of Printer
B. Operations of Embodiment
  B-1. General Flow of Abnormality Diagnosis Process
  B-2. Diagnosis with Communication Setting Information
  B-3. Diagnosis with Diagnosis Signal
C. Effects of Embodiment
D. Modifications A. System Configuration of Embodiment A-1. Configuration of Printer Monitor System FIG. 1 is a block diagram schematically illustrating the configuration of a printer monitor system as one embodiment of the abnormality diagnosis system of the invention. In the printer monitor system of this embodiment, a server S monitors via the Internet TE multiple printers P1 to P3 located in an intranet TR. The intranet TR is connected to the Internet TE via a proxy server PS, which has a firewall set to block unauthorized accesses from the Internet TE. The intranet TR is subnetted and includes multiple LANs. The printers P1 and P2 are located in an identical LAN, while the printer P3 is located in another LAN over a router R1.

As described above, the firewall is set in the proxy server PS to prohibit a direct access from the server S to any of the printers P1 to P3 inside the intranet TR. Each of the printers P1 to P3 in the intranet TR thus voluntarily makes an access to the server S via the Internet TE and informs the server S of a result of the self monitoring.

A-2. Structure of Printer

Figure 2:
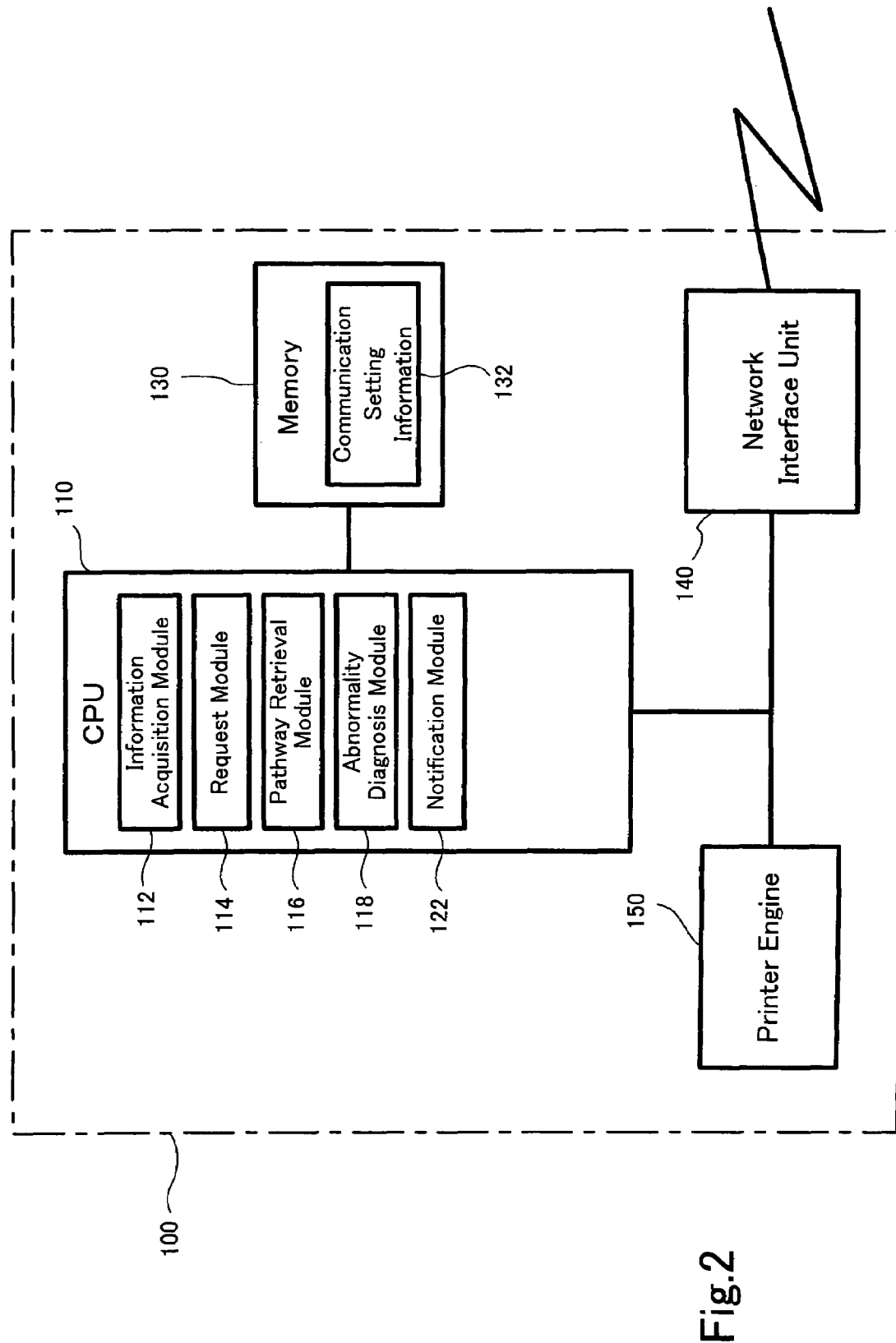
FIG. 2 is a block diagram illustrating the primary structure of each printer included in the printer monitor system of FIG. 1.

FIG. 2 is a block diagram illustrating the primary structure of each of the printers P1 to P3 (100) included in the printer monitor system of FIG. 1. The printer 100 mainly has a CPU 110 that executes firmware or another other computer program for processing and controls, a memory 130 that stores the computer program and diversity of data, a network interface unit 140 that is connected to a network for data transmission to and from other devices located on the network, and a printer engine 150 as an actual printing mechanism. These constituents are interconnected via a bus.

The CPU 110 reads the computer program from the memory 130 and executes the computer program to work as functional blocks of an information acquisition module 112, a request module 114, a pathway retrieval module 116, an abnormality diagnosis module 118, and a notification module 122. The CPU 110 also has functions of a print processing module to drive and control the printer engine 150 for actual printing operations and a monitor module to monitor the operations of the printer 100. These additional functions are omitted from the illustration of FIG. 2. The respective functional blocks may be actualized by the hardware configuration, instead of the software configuration.

The memory 130 stores communication setting information 132 required for communication with the server S, in addition to the computer program. The communication setting information 132 includes an IP address and a subnet mask of the self printer or the printer 100, a default route address, an address and a port number of the proxy server PS, a URL (Uniform Resource Locator) of the server S (including an address and a port number of the server S), and a user ID and a password required for an access to the server S.

The information acquisition module 112, the request module 114, the abnormality diagnosis module 118, and the notification module 122 of the embodiment shown in FIG. 2 are respectively equivalent to the information acquisition module, the request module, the abnormality diagnosis module, and the notification module of the invention.

B. Operations of Embodiment

In the print monitor system of FIG. 1, each of the printers P1 to P3 monitors the self operating conditions and makes an access to the server S via the intranet TR and the Internet TE at regular intervals to inform the server S of a result of the self monitoring.

When at least one of the printers P1 to P3 fails to access the server S, the server S detects the access failure and identifies the occurrence of communication failure between the printer and the server S. The server S selects a printer having a normal access to the server S among printers located inside an identical LAN or those located inside an identical intranet TR (inside an identical firewall). On the occasion of an access from the selected printer to the server S, the server S instructs the selected printer to make a diagnosis of abnormality. Namely the selected printer instead of the server S makes a diagnosis of abnormality in the printer having an access failure to the server S. In the description of the embodiment, the printer that has an access failure to the server S and is specified as an object of diagnosis of abnormality is referred to as the 'diagnosis object printer'. The printer that receives the instruction from the server S to make a diagnosis of abnormality in the diagnosis object printer is referred to as the 'diagnosis execution printer'.

The diagnosis object printer, the diagnosis execution printer, and the server S of the embodiment are respectively equivalent to the first device or the diagnosis object device, the second device or the abnormality diagnosable device, and the server of the invention.

B-1. General Flow of Abnormality Diagnosis Process

Figure 3:
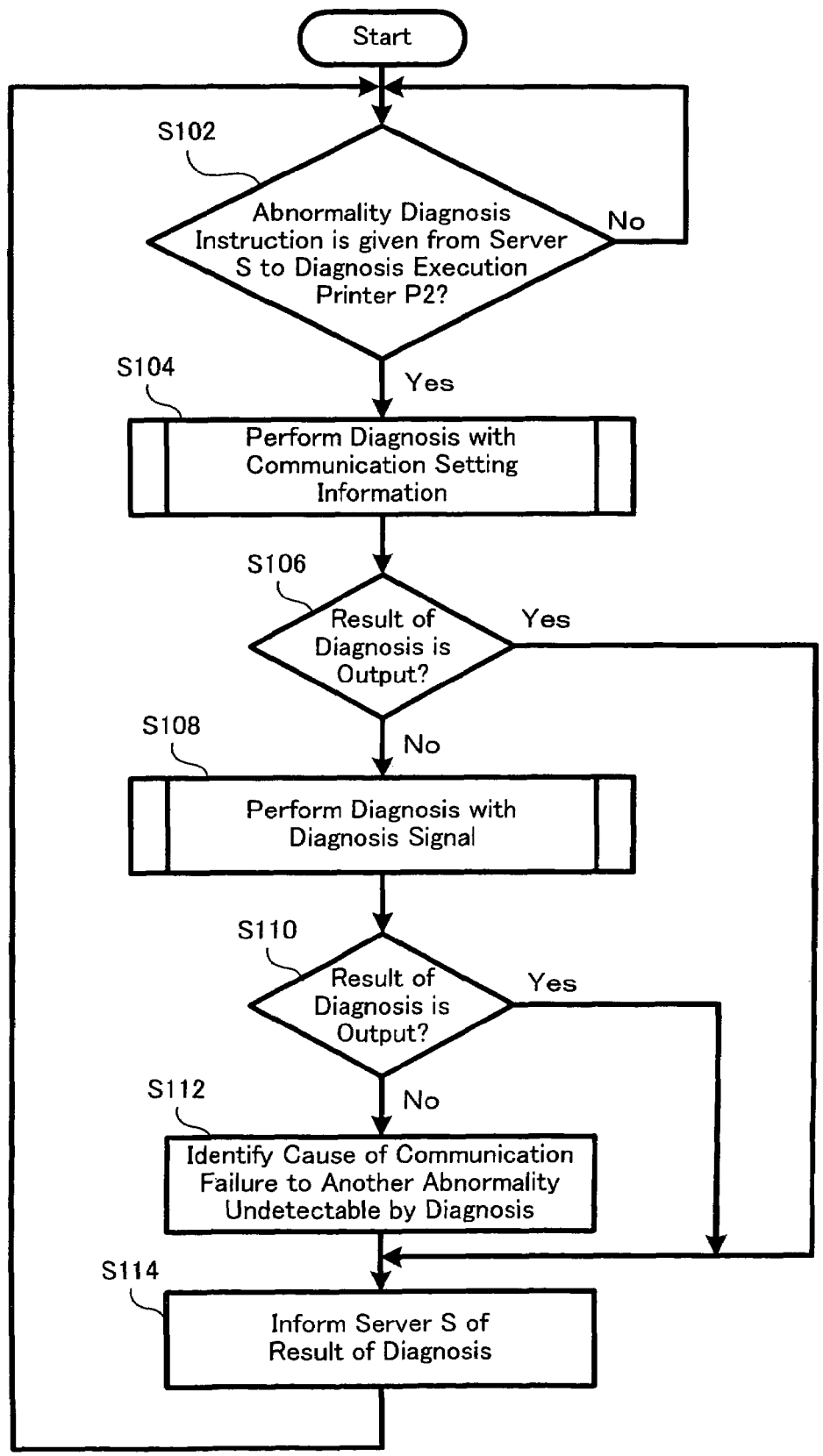
FIG. 3 is a flowchart showing an abnormality diagnosis routine executed in the embodiment.

FIG. 3 is a flowchart showing an abnormality diagnosis routine executed in the embodiment. In the description below with reference to the flowcharts of FIGS. 3 to 6, the printer P1 is the diagnosis object printer and the printer P2 is the diagnosis execution printer.

In the abnormality diagnosis routine of FIG. 3, the CPU 110 of the diagnosis execution printer P2 determines whether an abnormality diagnosis instruction is given from the server S to the diagnosis execution printer P2 on an access to the server S via the network interface unit 140 to make a diagnosis of abnormality in the diagnosis object printer P1 (step S102). When receiving the abnormality diagnosis instruction from the server S, the CPU 110 of the diagnosis execution printer P2 performs diagnosis with communication setting information (step S104). The server S informs the diagnosis execution printer P2 of an IP address allocated the diagnosis object printer P1 for the purpose of identification of the diagnosis object printer P1 in the process of giving the abnormality diagnosis instruction to the diagnosis execution printer P2.

The CPU 110 of the diagnosis execution printer P2 determines whether the diagnosis with communication setting information at step S104 outputs a result of the diagnosis (step S106). The processing flow goes to step S114 upon output of the result of the diagnosis. Upon no output of the result of the diagnosis, on the other hand, the processing flow goes to step S108 to perform diagnosis with diagnosis signal.

The CPU 110 of the diagnosis execution printer P2 subsequently determines whether the diagnosis with diagnosis signal at step S108 outputs a result of the diagnosis (step S110). The processing flow goes to step S114 upon output of the result of the diagnosis. Upon no output of the result of the diagnosis, on the other hand, the abnormality diagnosis module 118 in the CPU 110 of the diagnosis execution printer P2 identifies the cause of the communication failure to another abnormality in the diagnosis object printer P1, which is undetectable by the diagnosis with communication setting information or by the diagnosis with diagnosis signal (step S112).

At step S114, the notification module 122 in the CPU 110 of the diagnosis execution printer P2 then makes an access to the server S via the network interface unit 140 to inform the server S of the result of the diagnosis.

The processing flow returns to step S102 to wait until reception of another abnormality diagnosis instruction from the server S.

According to this processing flow, the diagnosis execution printer P2 instead of the server S makes a diagnosis of abnormality in the diagnosis object printer P1 and informs the server S of the result of the diagnosis.

B-2. Diagnosis with Communication Setting Information

The details of the diagnosis with communication setting information executed at step S104 in the flowchart of FIG. 3 are described below with reference to the flowchart of FIG. 4.

Figure 4:
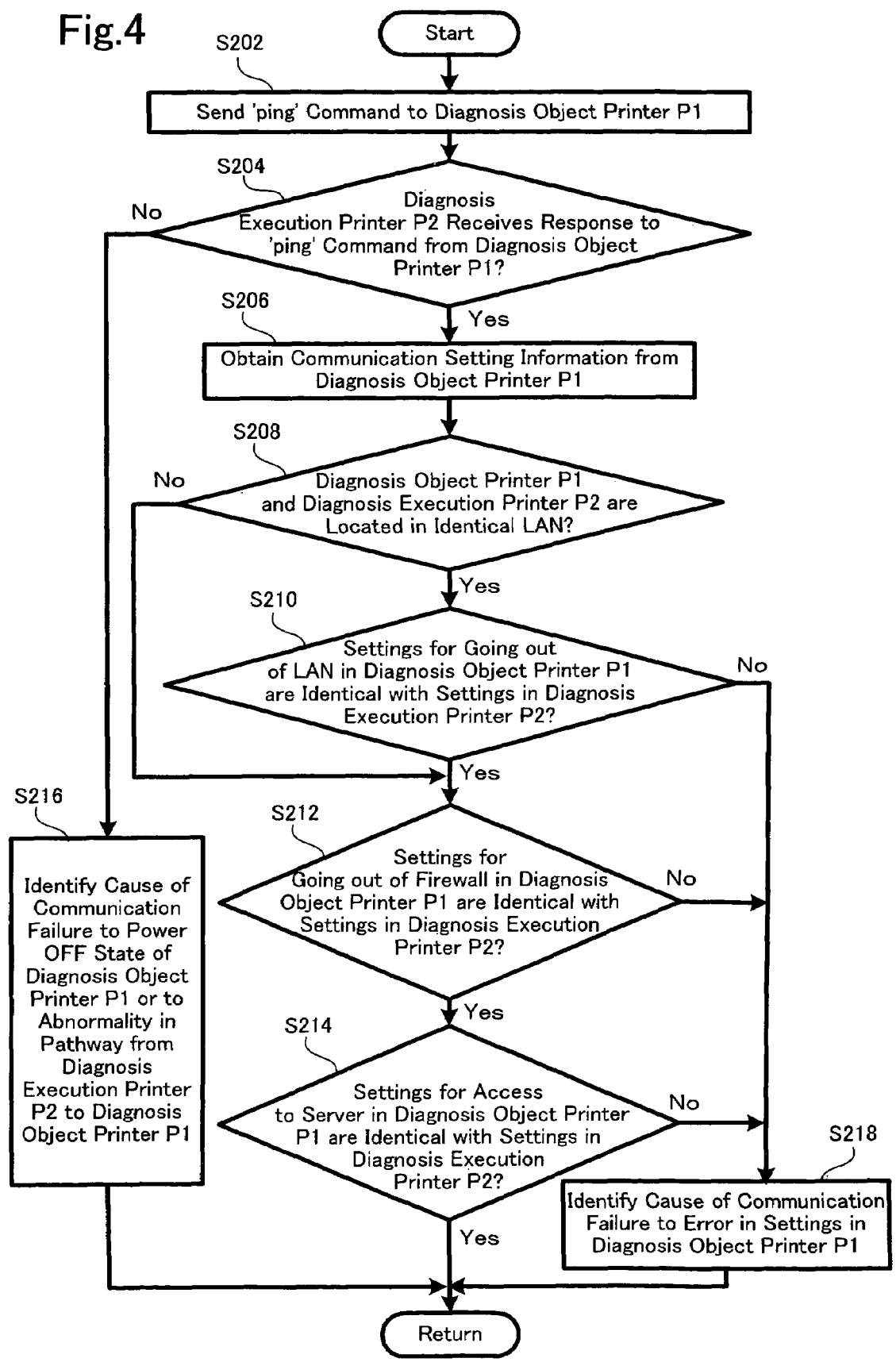
FIG. 4 is a flowchart showing the details of the diagnosis process with communication setting information executed at step S104 in the flowchart of FIG. 3.

In the diagnosis process routine of FIG. 4, the information acquisition module 112 in the CPU 110 of the diagnosis execution printer P2 identifies the IP address of the diagnosis object printer P1 sent from the server S and sends a 'ping' command on a protocol ICMP (Internet Control Message Protocol) via the network interface unit 140 to the diagnosis object printer P1 of the identified IP address (step S202). The abnormality diagnosis module 118 in the CPU 110 of the diagnosis execution printer P2 then determines whether the diagnosis object printer P1 responds to the 'ping' command sent on the ICMP protocol from the diagnosis execution printer P2 (step S204).

In the case of no response from the diagnosis object printer P1 to the 'ping' command on the ICMP protocol at step S204, the abnormality diagnosis module 118 of the diagnosis execution printer P2 identifies the cause of the communication failure to a power OFF state of the diagnosis object printer P1 or to an abnormality in a pathway from the diagnosis execution printer P2 to the diagnosis object printer P1 (step S216). The processing flow then goes to Return and terminates the diagnosis with communication setting information at step S104 in the abnormality diagnosis routine of FIG. 3.

In the case of no response from the diagnosis object printer P1 to the 'ping' command on the ICMP protocol, one possible modification of the processing flow may sequentially send adequate commands on other protocols, for example, a protocol SNMP (Simple Network Management Protocol) and a nonprocedural protocol Port 9100, to require responses from the diagnosis object printer P1. In the case of no responses from the diagnosis object printer P1 to the respective commands on the adopted protocols, the abnormality diagnosis module 118 of the diagnosis execution printer P2 identifies the cause of the communication failure to the power OFF state of the diagnosis object printer P1. In the case of a response from the diagnosis object printer P1 to a command on one of the adopted protocols, for example, the SNMP protocol or the nonprocedural protocol, the abnormality diagnosis module 118 of the diagnosis execution printer P2 may identify the cause of the communication failure to an internal error in the diagnosis object printer P1.

In the case of a response from the diagnosis object printer P1 to the 'ping' command on the ICMP protocol at step S204, on the other hand, the information acquisition module 112 of the diagnosis execution printer P2 adopts the SNMP protocol to obtain the communication setting information from the storage in the memory 130 of the diagnosis object printer P1 (step S206).

The abnormality diagnosis module 118 of the diagnosis execution printer P2 then extracts the IP address and the subnet mask of the self printer or the diagnosis execution printer P2 from the communication setting information stored in the memory 130 of the self printer or the diagnosis execution printer P2, while extracting the IP address of the diagnosis object printer P1 from the communication setting information obtained from the diagnosis object printer P1. The abnormality diagnosis module 118 of the diagnosis execution printer P2 refers to the extracted IP addresses and subnet mask and determines whether the diagnosis object printer P1 and the diagnosis execution printer P2 are located in an identical LAN (step S208). A concrete procedure of the determination sets the respective IP addresses and the subnet mask as 32-bit arrays and compares a result of a logic operation AND between the IP address of the diagnosis object printer P1 and the subnet mask of the diagnosis execution printer P2 with a result of a logic operation AND between the IP address and the subnet mask of the diagnosis execution printer P2. When the results of the two AND operations are identical with each other, it is determined that the diagnosis object printer P1 and the diagnosis execution printer P2 are located in an identical LAN. When the results of the two AND operations are different from each other, on the contrary, it is determined that the diagnosis object printer P1 and the diagnosis execution printer P2 are not located in an identical LAN. For example, the diagnosis object printer P1 has an IP address '163.141.1.233', and the diagnosis execution printer P2 has an IP address '163.141.2.100' and the subnet mask '255.255.255.0'. The AND operation between the IP address of the diagnosis object printer P1 and the subnet mask of the diagnosis execution printer P2 gives '163.141.1.0'. The AND operation between the IP address and the subnet mask of the diagnosis execution printer P2 gives '163.141.2.0'. The results of these two AND operations are different from each other. The abnormality diagnosis module 118 accordingly determines that the diagnosis object printer P1 and the diagnosis execution printer P2 are not located in an identical LAN.

In response to a negative answer at step S208 (when the diagnosis object printer P1 and the diagnosis execution printer P2 are not located in an identical LAN), the processing flow goes to step S212. In response to an affirmative answer at step S208 (when the diagnosis object printer P1 and the diagnosis execution printer P2 are located in an identical LAN), on the other hand, the abnormality diagnosis module 118 of the diagnosis execution printer P2 extracts the subnet mask and the default route address set in the self printer or the diagnosis execution printer P2 from the communication setting information stored in the memory 130 of the self printer or the diagnosis execution printer P2, while extracting the subnet mask and the default route address set in the diagnosis object printer P1 from the communication setting information obtained from the diagnosis object printer P1. Two printers located in an identical LAN are expected to have an identical subnet mask and an identical default route address. The subnet mask and the default route address represent communication settings to go out of the LAN. The abnormality diagnosis module 118 of the diagnosis execution printer P2 compares the extracted subnet masks and default route addresses set in the two printers P1 and P2 with each other and determines whether the subnet mask and the default route address set in the diagnosis object printer P1 are identical with the subnet mask and the default route address set in the diagnosis execution printer P2 (step S210).

In response to a negative answer at step S210 (when the subnet mask and the default route address set in the diagnosis object printer P1 are not identical with the subnet mask and the default route address set in the diagnosis execution printer P2), the abnormality diagnosis module 118 of the diagnosis execution printer P2 identifies the cause of the communication failure to an error in at least one of the subnet mask and the default route address set in the diagnosis object printer P1 (step S218). The processing flow then goes to Return and terminates the diagnosis with communication setting information at step S104 in the abnormality diagnosis routine of FIG. 3. In response to an affirmative answer at step S210 (when the subnet mask and the default route address set in the diagnosis object printer P1 are identical with the subnet mask and the default route address set in the diagnosis execution printer P2), on the other hand, the processing flow goes to step S212. The abnormality diagnosis module 118 of the diagnosis execution printer P2 extracts the address and the port number of the proxy server PS set in the self printer or the diagnosis execution printer P2 from the communication setting information stored in the memory 130 of the self printer or the diagnosis execution printer P2, while extracting the address and the port number of the proxy server PS set in the diagnosis object printer P1 from the communication setting information obtained from the diagnosis object printer P1. Two printers located in an identical intranet are expected to make connections to the Internet via an identical proxy server and accordingly have identical settings of the address and the port number of the proxy server. The address and the port number of the proxy server represent communication settings to go out of the firewall. The abnormality diagnosis module 118 of the diagnosis execution printer P2 compares the extracted communication settings in the two printers P1 and P2 with each other and determines whether the address and the port number of the proxy server PS set in the diagnosis object printer P1 are identical with the address and the port number of the proxy server PS set in the diagnosis execution printer P2 (step S212).

In response to a negative answer at step S212 (when the address and the port number of the proxy server PS set in the diagnosis object printer P1 are not identical with the address and the port number of the proxy server PS set in the diagnosis execution printer P2), the abnormality diagnosis module 118 of the diagnosis execution printer P2 identifies the cause of the communication failure to an error in at least one of the address and the port number of the proxy server PS set in the diagnosis object printer P1 (step S218). The processing flow then goes to Return and terminates the diagnosis with communication setting information at step S104 in the abnormality diagnosis routine of FIG. 3. In response to an affirmative answer at step S212 (when the address and the port number of the proxy server PS set in the diagnosis object printer P1 are identical with the address and the port number of the proxy server PS set in the diagnosis execution printer P2), on the other hand, the processing flow goes to step S214. The abnormality diagnosis module 118 of the diagnosis execution printer P2 extracts the URL of the server S and the user ID and the password for an access to the server S set in the self printer or the diagnosis execution printer P2 from the communication setting information stored in the memory 130 of the self printer or the diagnosis execution printer P2, while extracting the URL of the server S, the user ID, and the password set in the diagnosis object printer P1 from the communication setting information obtained from the diagnosis object printer P1. Two printers making accesses to an identical server are expected to have identical settings of the URL of the server, the user ID, and the password. The URL of the server, the user ID, and the password represent communication settings to make an access to the server S. The abnormality diagnosis module 118 of the diagnosis execution printer P2 compares the extracted communication settings in the two printers P1 and P2 with each other and determines whether the URL of the server S, the user ID, and the password set in the diagnosis object printer P1 are identical with the URL of the server S, the user ID, and the password set in the diagnosis execution printer P2 (step S214).

In response to a negative answer at step S214 (when the URL of the server S, the user ID, and the password set in the diagnosis object printer P1 are not identical with the URL of the server S, the user ID, and the password set in the diagnosis execution printer P2), the abnormality diagnosis module 118 of the diagnosis execution printer P2 identifies the cause of the communication failure to an error in at least one of the URL of the server S, the user ID, and the password set in the diagnosis object printer P1 (step S218). The processing flow then goes to Return and terminates the diagnosis with communication setting information at step S104 in the abnormality diagnosis routine of FIG. 3. In response to an affirmative answer at step S214 (when the URL of the server S, the user ID, and the password set in the diagnosis object printer P1 are identical with the URL of the server S, the user ID, and the password set in the diagnosis execution printer P2), on the other hand, the processing flow immediately goes to Return and terminates the diagnosis with communication setting information at step S104 in the abnormality diagnosis routine of FIG. 3.

B-3. Diagnosis with Diagnosis Signal

The details of the diagnosis with diagnosis signal executed at step S108 in the flowchart of FIG. 3 are described below with reference to the flowcharts of FIGS. 5 and 6.

Figure 5:
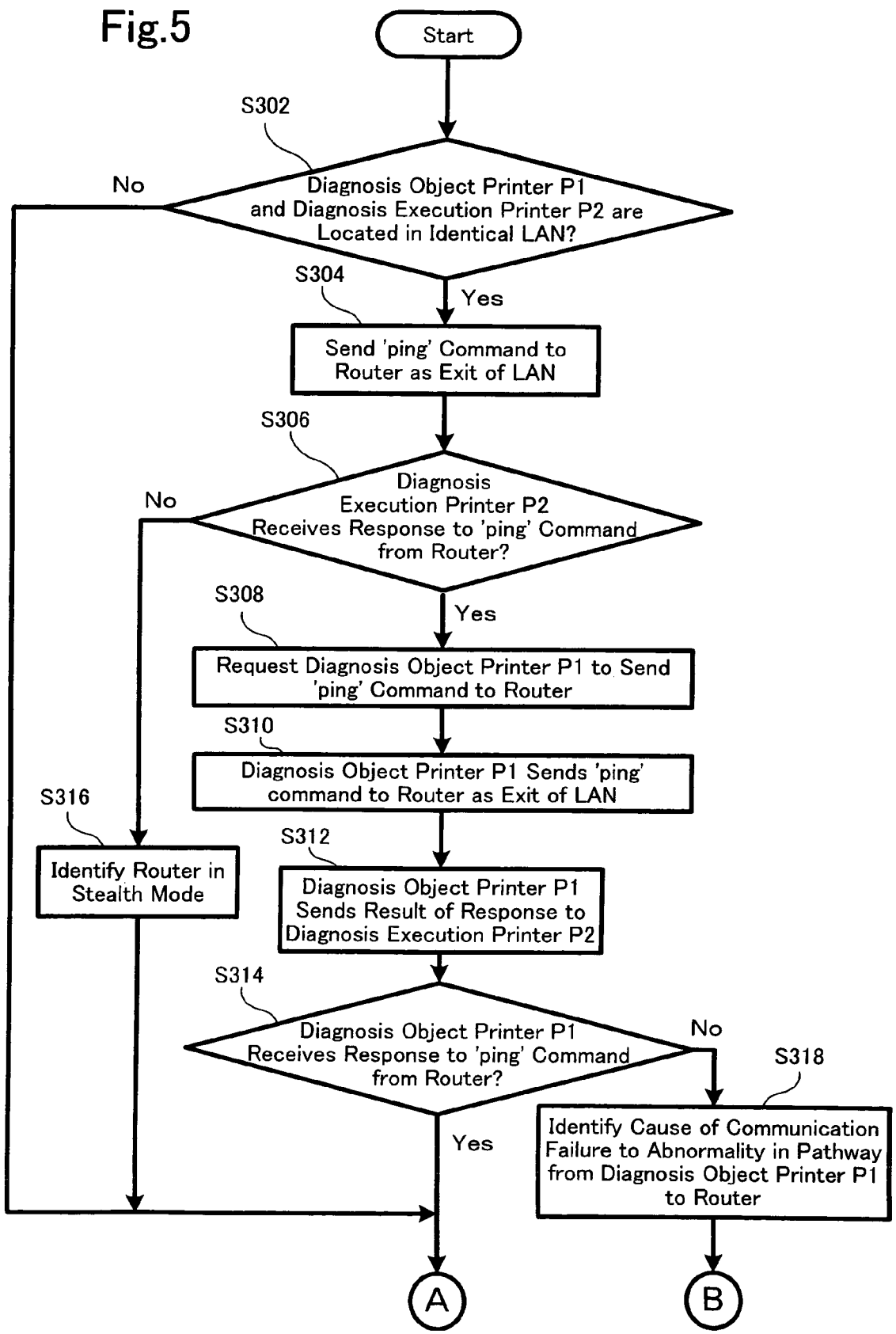
FIG. 5 is a flowchart showing the details of the diagnosis process with diagnosis signal executed at step S108 in the flowchart of FIG. 3.

In the diagnosis process routine of FIG. 5, the abnormality diagnosis module 118 in the CPU 110 of the diagnosis execution printer P2 first extracts the IP address and the subnet mask of the self printer or the diagnosis execution printer P2 from the communication setting information stored in the memory 130 of the self printer or the diagnosis execution printer P2, while extracting the IP address of the diagnosis object printer P1 from the communication setting information obtained from the diagnosis object printer P1. The abnormality diagnosis module 118 of the diagnosis execution printer P2 refers to the extracted IP addresses and subnet mask and determines whether the diagnosis object printer P1 and the diagnosis execution printer P2 are located in an identical LAN (step S302). The processing of step S302 is identical with the processing of step S208 in the flowchart of FIG. 4.

Figure 6:
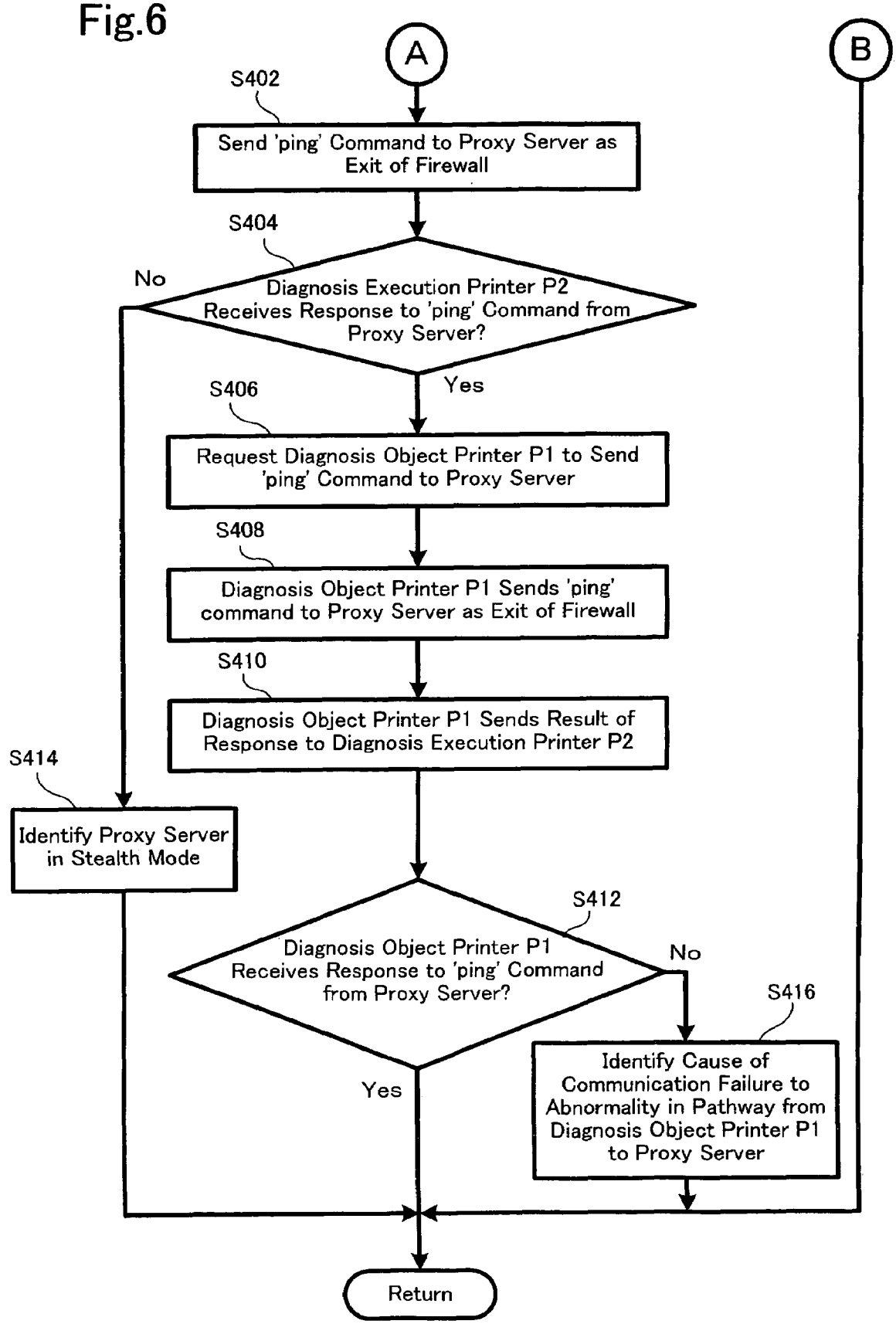
FIG. 6 is a flowchart showing the details of the diagnosis process with the diagnosis signal executed at step S108 in the flowchart of FIG. 3.

In response to a negative answer at step S302 (when the diagnosis object printer P1 and the diagnosis execution printer P2 are not located in an identical LAN), the processing flow goes to step S402 in the flowchart of FIG. 6. In response to an affirmative answer at step S302 (when the diagnosis object printer P1 and the diagnosis execution printer P2 are located in an identical LAN), on the other hand, the pathway retrieval module 116 in the CPU 110 of the diagnosis execution printer P2 extracts the default route address set in the self printer or the diagnosis execution printer P2 from the communication setting information stored in the memory 130 of the self printer or the diagnosis execution printer P2 and sends a 'ping' command on the ICMP protocol as a diagnosis signal via the network interface unit 140 to the router R1 as the exit of the LAN based on the extracted default route address (step S304). The abnormality diagnosis module 118 in the CPU 110 of the diagnosis execution printer P2 then determines whether the router R1 responds to the 'ping' command sent on the ICMP protocol from the diagnosis execution printer P2 (step S306).

In the case of no response to the 'ping' command from the router R1 to the diagnosis execution printer P2 at step S306, the abnormality diagnosis module 118 of the diagnosis execution printer P2 identifies the router R1 in a stealth mode of giving no responses to requests (step S316). The processing flow then goes to step S402 in the flowchart of FIG. 6. In the case of a response to the 'ping' command from the router R1 to the diagnosis execution printer P2 at step S306, on the other hand, the request module 114 in the CPU 110 of the diagnosis execution printer P2 adopts the SNMP protocol to request the diagnosis object printer P1 via the network interface unit 140 to send a 'ping' command to the router R1 (step S308). Upon this request, the pathway retrieval module 116 in the CPU 110 of the diagnosis object printer P1 sends a 'ping' command on the ICMP protocol as a diagnosis signal via the network interface unit 140 to the router R1 as the exit of the LAN (step S310). The pathway retrieval module 116 of the diagnosis object printer P1 sends a result of the response from the router R1 to the 'ping' command to the diagnosis execution printer P2 (step S312). The abnormality diagnosis module 118 in the CPU 110 of the diagnosis execution printer P2 refers to the received result of the response and determines whether the router R1 responds to the 'ping' command sent on the ICMP protocol from the diagnosis object printer P1 (step S314).

In the case of no response to the 'ping' command from the router R1 to the diagnosis object printer P1 at step S314, the abnormality diagnosis module 118 of the diagnosis execution printer P2 identifies the cause of the communication failure to an abnormality in a communication pathway from the diagnosis object printer P1 to the router R1 (step S318). The processing flow then goes to Return in the flowchart of FIG. 6 and terminates the diagnosis with diagnosis signal at step S108 in the abnormality diagnosis routine of FIG. 3. In the case of a response to the 'ping' command from the router R1 to the diagnosis object printer P1 at step S314, on the contrary, the processing flow goes to step S402 in the flowchart of FIG. 6.

At step S402 in the diagnosis process routine of FIG. 6, the pathway retrieval module 116 in the CPU 110 of the diagnosis execution printer P2 extracts the address of the proxy server PS set in the self printer or the diagnosis execution printer P2 from the communication setting information stored in the memory 130 of the self printer or the diagnosis execution printer P2 and sends a 'ping' command on the ICMP protocol as a diagnosis signal via the network interface unit 140 to the proxy server PS as the exit of the firewall based on the extracted address. The abnormality diagnosis module 118 in the CPU 110 of the diagnosis execution printer P2 then determines whether the proxy server PS responds to the 'ping' command sent on the ICMP protocol from the diagnosis execution printer P2 (step S404).

In the case of no response to the 'ping' command from the proxy server PS to the diagnosis execution printer P2 at step S404, the abnormality diagnosis module 118 of the diagnosis execution printer P2 identifies the proxy server PS in a stealth mode of giving no responses to requests (step S414). The processing flow then goes to Return and terminates the diagnosis with diagnosis signal at step S108 in the abnormality diagnosis routine of FIG. 3. In the case of a response to the 'ping' command from the proxy server PS to the diagnosis execution printer P2 at step S404, on the other hand, the request module 114 in the CPU 110 of the diagnosis execution printer P2 adopts the SNMP protocol to request the diagnosis object printer P1 via the network interface unit 140 to send a 'ping' command to the proxy server PS (step S406). Upon this request, the pathway retrieval module 116 in the CPU 110 of the diagnosis object printer P1 sends a 'ping' command on the ICMP protocol as a diagnosis signal via the network interface unit 140 to the proxy server PS as the exit of the firewall (step S408). The pathway retrieval module 116 of the diagnosis object printer P1 sends a result of the response from the proxy server PS to the 'ping' command to the diagnosis execution printer P2 (step S410). The abnormality diagnosis module 118 in the CPU 110 of the diagnosis execution printer P2 refers to the received result of the response and determines whether the proxy server PS responds to the 'ping' command sent on the ICMP protocol from the diagnosis object printer P1 (step S412).

In the case of no response to the 'ping' command from the proxy server PS to the diagnosis object printer P1 at step S412, the abnormality diagnosis module 118 of the diagnosis execution printer P2 identifies the cause of the communication failure to an abnormality in a communication pathway from the diagnosis object printer P1 to the proxy server PS (step S416). The processing flow then goes to Return and terminates the diagnosis with diagnosis signal at step S108 in the abnormality diagnosis routine of FIG. 3. When the processing flow passes through step S314 in the flowchart of FIG. 5 and the determination result of step S314 shows a response to the 'ping' command from the router R1 to the diagnosis object printer P1, it is clear that the communication pathway from the diagnosis object printer P1 to the router R1 has no abnormality. In this case, the abnormality diagnosis module 118 may identify the cause of the communication failure to an abnormality in a communication pathway from the router R1 to the proxy server PS at step S416. In the case of a response to the 'ping' command from the proxy server PS to the diagnosis object printer P1 at step S412, on the other hand, the processing flow immediately goes to Return and terminates the diagnosis with diagnosis signal at step S108 in the abnormality diagnosis routine of FIG. 3.

C. Effects of Embodiment

In the printer monitor system of the embodiment described above, in the event of an access failure from a certain printer (diagnosis object printer P1) to the server S, the server S instructs another printer (diagnosis execution printer P2) located inside an identical LAN or inside an identical intranet (inside an identical firewall) to make a diagnosis of abnormality in the diagnosis object printer P1. The diagnosis execution printer P2 informs the server S of a result of the abnormality diagnosis. The server S can thus identify the cause of communication failure between the diagnosis object printer P1 and the server S. The diagnosis with communication setting information at step S104 in the abnormality diagnosis routine of FIG. 3 enables the server S to readily identify the cause of communication failure to an abnormality in the diagnosis object printer P1. The diagnosis with diagnosis signal at step S108 in the abnormality diagnosis routine of FIG. 3 enables the server S to readily identify the cause of communication failure to an abnormality in the communication pathway from the diagnosis object printer P1 to the server S.

When the communication failure is ascribed to an error of the communication setting information set in the diagnosis object printer P1, the server S may instruct the diagnosis execution printer P2 to duplicate the communication setting information set in the diagnosis execution printer P2 and set the duplicate of the communication setting information into the diagnosis object printer P1. The diagnosis execution printer P2 adopts the SNMP protocol to set the duplicate of the own communication setting information into the diagnosis object printer P1, restart the diagnosis object printer P1, and confirm a normal operation of the diagnosis object printer P1.

When the communication failure is ascribed to an abnormality in the communication pathway from the diagnosis object printer P1 to the server S, the server S may instruct a mechanic to fix an abnormal network resource, for example, an abnormal device in the communication pathway or an abnormal communication line. For the convenience of the fixing by the mechanic, the server S may instruct a normal printer to print out an abnormality elimination procedure including a result of the diagnosis and an object place to be fixed.

D. Modifications

The embodiment and its modifications discussed above are to be considered in all aspects as illustrative and not restrictive. There may be many other modifications, changes, and alterations without departing from the scope or spirit of the main characteristics of the present invention.

In the printer monitor system of the embodiment, the server S informs the diagnosis execution printer P2 of an IP address allocated to the diagnosis object printer P1 for the purpose of identification of the diagnosis object printer P1 in the process of giving the abnormality diagnosis instruction to the diagnosis execution printer P2. When an IP address is allocated automatically by a protocol DHCP (Dynamic Host Configuration Protocol) to each printer in the intranet TR, however, the server S can not inform the diagnosis execution printer P2 of the IP address allocated to the diagnosis object printer P1. In such cases, the server S informs the diagnosis execution printer P2 of device identification information of the diagnosis object printer P1, for example, a MAC address or a serial number of the diagnosis object printer P2, instead of the IP address allocated to the diagnosis object printer P1. The diagnosis execution printer P2 makes an inquiry about the device identification information to all devices located in an identical LAN by broadcast and individually obtains the device identification information from the respective devices. The diagnosis execution printer P2 obtains the IP addresses of the respective devices together with the device identification information. The diagnosis execution printer P2 compares the obtained device identification information with the device identification information of the diagnosis object printer P1 sent from the server S and determines whether any of the obtained device identification information is identical with the device identification information of the diagnosis object printer P1. When there is any device having the identical device identification information, the device is identified as the diagnosis object printer P1. The diagnosis execution printer P2 executes the subsequent processing flow of the abnormality diagnosis based on the obtained IP address of the identified diagnosis object printer P1. When there is no device having the identical device identification information, on the other hand, the diagnosis execution printer P2 identifies the cause of the communication failure to the power OFF state of the diagnosis object printer P1 or to an abnormality in the pathway from the diagnosis execution printer P2 to the diagnosis object printer P1.

In the diagnosis with communication setting information shown in the flowchart of FIG. 4, the information acquisition module 112 of the diagnosis execution printer P2 obtains the communication setting information from the diagnosis object printer P1 in the case of a response to the 'ping' command from the diagnosis object printer P1. The diagnosis execution printer P2 may execute an additional series of processing prior to the acquisition of the communication setting information as described below.

The diagnosis execution printer P2 adopts the SNMP protocol to determine whether a monitor software module is active in the diagnosis object printer P1 and inform the server S of a result of the determination. The monitor software module monitors the operating conditions of the self printer or the diagnosis object printer P1 and notifies the server S of a result of the monitoring. When the monitor software module is inactive in the diagnosis object printer P1, the server S instructs the diagnosis execution printer P2 to change the settings of the diagnosis object printer P1. In response to this instruction, the diagnosis execution printer P2 adopts the SNMP protocol to change the settings of the diagnosis object printer P1 for activation of the monitor software module, restart the diagnosis object printer P1, and determine again whether the monitor software module is active in the diagnosis object printer P1.

In the diagnosis with diagnosis signal shown in the flowcharts of FIGS. 5 and 6, the 'ping' command on the ICMP protocol is used as the diagnosis signal. The 'ping' command may be replaced by a 'traceroute' command on the ICMP protocol. The 'ping' command is generally used to determine whether a packet sent via a TCP/IP network is successfully delivered to a destination and to specify a response time from the destination. The 'traceroute' command is used to identify a pathway to the destination. The result of a response to the 'ping' command readily identifies successful or failed delivery of a packet to a destination and a response time from the destination. The result of a response to the 'traceroute' command readily identifies a pathway to an object host and a required time to a middle gateway. The use of the 'traceroute' command as the diagnosis signal thus readily locates a communication failure on the communication pathway.

The embodiment regards the printer monitor system including multiple printers as the devices connected to the server S via the network. The technique of the invention is, however, not restricted to the printers but is also applicable to any other devices connected to the server S, for example, copying machines, facsimiles, and scanners.

The abnormality diagnosis system of the invention may be modified in various ways for diverse applications. For example, in the event of a change of the settings of a firewall, the settings of the firewall may be updated in only a certain printer included in an intranet. All the other printers included in the intranet are then not allowed to make access to the server S, and the cause of this communication failure is identified to an error of the communication setting information. The server S instructs the certain printer to duplicate the own communication setting information and set the duplicate of the communication setting information into each of the other printers included in the intranet. This enables the updated settings of the firewall to be automatically reflected in the other printers included in the intranet.

The abnormality diagnosis system of the invention is applicable to a charging process in the server S for the use of the respective printers. When a communication failure is ascribed to an abnormality in an intranet or to an abnormality in a firewall, the server S identifies an intentional interference of a normal connection from a printer to the server S. The server S instructs the diagnosis execution printer P2 to prohibit printing with the printer having an access failure to the server S (that is, the diagnosis object printer P1). The diagnosis execution printer P2 then adopts the SNMP protocol to prohibit printing with the diagnosis object printer P1. The prohibition of printing with the diagnosis object printer P1 is kept until a normal access from the diagnosis object printer P1 to the server S. This desirably restrains the unauthorized use of toners and other expendables and prevents a cheating in charging and payment.

What is claimed is:

1. An abnormality diagnosis system comprising:
a first and a second printer; and
a server apparatus that manages the first and the second printer via a network,
wherein the server apparatus comprises: an instructing unit that, when a communication failure occurs between the server apparatus and the first printer, sends an instruction for diagnosing an abnormality in the first printer to the second printer via the network,
wherein the second printer comprises:
a receiving unit that receives the instruction from the server apparatus via the network;
a diagnosing unit that diagnoses the abnormality in the first printer based on the received instruction; and
a informing unit that informs the server apparatus of a result of diagnosing by the diagnosing unit via the network.

2. The abnormality diagnosis system according to claim 1, wherein the diagnosing unit of the second printer comprises:
an obtaining unit that obtains first setting information for communication between the server apparatus and the first printer from the first printer; and
a comparing unit that compares the obtained first setting information with second setting information for between the server apparatus and the second printer, to diagnose the abnormality in the first printer.

3. The abnormality diagnosis system according to claim 1, wherein the diagnosing unit of the second printer comprises:
a requesting unit that requests the first printer to transmit a diagnosis signal to a communication apparatus located on a communication path from the first printing to the server apparatus; and
a response receiving unit that receives a result of the diagnosis signal from the first printer, to diagnose the abnormality in the first printer.

4. The abnormality diagnosis system according to claim 1, wherein the diagnosing unit of the second printer comprises:
a transmitting unit that transmits a diagnosis signal to the first printer; and
a response receiving unit that receives a result of the diagnosis signal from the first printer, to diagnose the abnormality in the first printer.

5. The abnormality diagnosis system according to claim 1, wherein the first and the second printer are located inside a firewall and the server apparatus is located outside the firewall.

6. A first printer comprising:
a diagnosing unit that diagnoses an abnormality in a second printer, when a communication failure occurs between the second printer and a server apparatus, the server apparatus managing the first printer and the second printer via a network; and a informing unit that informs the server apparatus of a result of diagnosing by the diagnosing unit via the network.

7. An abnormality diagnosis method comprising:

sending an instruction for diagnosing an abnormality in a first printer to a second printer via a network from a server apparatus, when a communication failure occurs between the server apparatus and the first printer, wherein the server apparatus manages the first printer and the second printer via the network;

receiving, by the second printer, the instruction from the server apparatus via the network;

diagnosing, by the second printer, the abnormality in the first printer based on the received instruction; and informing the server apparatus of a result of the diagnosing via the network from the second printer.

8. A computer readable medium storing computer instructions to enable a computer executing said instruction to perform an abnormality diagnosis method, said method comprising:

sending an instruction for diagnosing an abnormality in a first printer to a second printer via a network from a server apparatus, when a communication failure occurs between the server apparatus and the first printer, wherein the server apparatus manages the first printer and the second printer via the network;

receiving, by the second printer, the instruction from the server apparatus via the network;

diagnosing, by the second printer, the abnormality in the first printer based on the received instruction; and informing the server apparatus of a result of the diagnosing via the network from the second printer.

* * * * *